US006937298B2

(12) United States Patent
Okada (10) Patent No.: US 6,937,298 B2
(45) Date of Patent: Aug. 30, 2005

(54) GAMING MACHINE HAVING A PROTECTIVE MEMBER COVERING DRIVE UNIT AND AT LEAST A PORTION OF THE LIGHT EMISSION MEANS

(75) Inventor: Kazuo Okada, Tokyo (JP)

(73) Assignee: Aruze Corp., Tokyo (JP)

( * ) Notice: Subject to any disclaimer, the term of this patent is extended or adjusted under 35 U.S.C. 154(b) by 0 days.

(21) Appl. No.: 10/697,432

(22) Filed: Oct. 31, 2003

(65) Prior Publication Data

US 2004/0227866 A1 Nov. 18, 2004

(30) Foreign Application Priority Data

May 14, 2003 (JP) ........................................ 2003-136634

(51) Int. Cl.$^7$ ..................... G02F 1/1333; G02F 1/1335; G06F 17/00
(52) U.S. Cl. ............................. 349/58; 349/65; 463/46
(58) Field of Search ................................ 463/1, 16–25, 463/40–42, 46, 47; 349/58, 65; 273/143 R (56) References Cited

U.S. PATENT DOCUMENTS

| | | | | |
|---|---|---|---|---|
| 5,667,439 A | * | 9/1997 | Okada | .......................... 463/20 |
| 5,695,188 A | * | 12/1997 | Ishibashi | ................ 273/143 R |
| 5,836,819 A | * | 11/1998 | Ugawa | .......................... 463/30 |
| 5,934,672 A | * | 8/1999 | Sines et al. | ............. 273/143 R |
| 6,181,394 B1 | | 1/2001 | Sanelle et al. | |
| 6,705,611 B2 | * | 3/2004 | Kato | ....................... 273/143 R |
| 2001/0031658 A1 | | 10/2001 | Ozaki et al. | |
| 2003/0016313 A1 | | 1/2003 | Jeong | |
| 2003/0087690 A1 | | 5/2003 | Loose et al. | |

FOREIGN PATENT DOCUMENTS

JP 2002-143377 A1 5/2002

OTHER PUBLICATIONS

European Search Report, Ref. EP30184UW900df, Mar. 23, 2005 (3 pages).

* cited by examiner

Primary Examiner—Tarifur R. Chowdhury
(74) Attorney, Agent, or Firm—Rader, Fishman & Grauer PLLC (57) ABSTRACT

A gaming machine includes a liquid crystal display having a liquid crystal panel and a light guiding plate disposed at the rear of the liquid crystal panel, the light guiding plate being formed with light transmission areas through which light passes; a variable display device being placed at the rear of the liquid crystal display and opposed to the light transmission areas and having a plurality of reels provided in a row each on which a plurality of symbols are arranged; light emission means being provided in the proximity of the light transmission areas on the reel side; a drive unit for driving the light emission means; and a protective member for covering the drive unit, the protective member having an outer shape at a predetermined distance or more distant from the drive unit.

4 Claims, 7 Drawing Sheets

| | LEFT REEL | | CENTER REEL | | RIGHT REEL |
|---|---|---|---|---|---|
| 00 | 7 | 00 | 7 | 00 | 7 |
| 01 | cherry | 01 | balloon | 01 | bell |
| 02 | 2 | 02 | Replay | 02 | Replay |
| 03 | bell | 03 | bell | 03 | BAR |
| 04 | Replay | 04 | cherry | 04 | balloon |
| 05 | 7 | 05 | Replay | 05 | bell |
| 06 | cherry | 06 | cherry | 06 | Replay |
| 07 | 2 | 07 | bell | 07 | cherry |
| 08 | bell | 08 | BAR | 08 | 2 |
| 09 | Replay | 09 | cherry | 09 | cherry |
| 10 | balloon | 10 | Replay | 10 | bell |
| 11 | bell | 11 | bell | 11 | Replay |
| 12 | Replay | 12 | 2 | 12 | cherry |
| 13 | BAR | 13 | Replay | 13 | balloon |
| 14 | 7 | 14 | cherry | 14 | bell |
| 15 | bell | 15 | bell | 15 | Replay |
| 16 | balloon | 16 | BAR | 16 | cherry |
| 17 | Replay | 17 | balloon | 17 | 2 |
| 18 | balloon | 18 | Replay | 18 | bell |
| 19 | bell | 19 | bell | 19 | Replay |
| 20 | Replay | 20 | cherry | 20 | cherry |

GAMING MACHINE HAVING A PROTECTIVE MEMBER COVERING DRIVE UNIT AND AT LEAST A PORTION OF THE LIGHT EMISSION MEANS

BACKGROUND OF THE INVENTION

1. Field of the Invention

The present invention relates to a gaming machine such as a pinball slot machine (a so-called "Pachi-Slot machine" in Japan) or a pinball machine (a so-called "Pachinko machine" in Japan) including a liquid crystal display aside from a variable display device provided with a plurality of reels.

2. Description of the Related Art

For example, a pinball slot machine (a so-called "Pachi-Slot machine" in Japan) has a mechanical variable display device provided with a plurality of reels for variably displaying symbols in a front display window or an electric variable display device for displaying symbols on reels on a screen. As the player performs start operation, control means controls the variable display device for rotating the reels, thereby producing variable display of symbols. Then, the rotating reels are stopped in order automatically in a given time or as the player performs stop operation. At this time, if the symbols on the reels appearing in the display window become a specific combination (winning symbol combination), game medium such as medals or coins are paid out to the player as the prize of the win.

In the current mainstream model, to complete a winning game for paying out medals and coins to the player as a specific symbol combination is arranged along the pay line made activated, which will be hereinafter referred to as activated line, it is required that a prize be won according to internal lottery processing (simply, internal lottery), which will be hereinafter referred to as internal winning, and that the player perform stop operation at the timing at which the symbol combination indicating completion of the winging game of the prize gaining the internal winning, which will be hereinafter referred to as internal winning combination, can be stopped on the activated line. That is, even if the internal winning is accepted, if the player cannot perform the stop operation at the good timing, the player cannot complete the winning game of the internal winning combination. That is, the gaming machines requiring that the player have a technique for performing the stop operation at the good timing (the relative importance of intervention of the technique called "observation push" is high) are mainstream at present.

A gaming machine is provided for displaying on a liquid crystal display provided aside from the mechanical variable display device, a symbol or a message required for arranging a specific symbol combination along the activated line when the variable display device stops based on the skill of the player concerning the press push so that even the player having a low skill of game play operation can play a game taking an interest in the game play.

The gaming machine in the related art includes the liquid crystal display being disposed ahead of reels viewed from the front for displaying an image from the outside of the area of a reel display window to the inside of the area and superposing the image on the reel symbols for display to enhance the effect of the game aside from the mechanical variable display device for stopping and displaying symbols on reels with respect to a symbol combination responsive to the winning state of game play.

In the liquid crystal display used at the time, the reel-opposed part of a light guiding plate with a light deflection pattern to guide light from a backlight light source into a liquid crystal panel, which will be hereinafter referred to as reel window, is cut out. Thus, a cold-cathode tube is placed above and below the reel window (or in the surroundings thereof) as auxiliary light so that the reel window of the light guiding plate where the light deflection pattern cannot be provided does not become dark.

The configuration described above is disclosed in JP-A-2002-143377 (see paragraph [0053] and FIG. 4).

SUMMARY OF THE INVENTION

In the gaming machine in the related art as described above, an inverter circuit used as a power generation circuit of the cold-cathode tube mentioned above is housed in a protective case so that the inverter circuit is not physically destroyed. The protective case, which has the minimum size, may be unable to protect the inverter circuit from the effect of a magnetic force such as a magnetized screwdriver comes in contact with or approaches the protective case (inverter circuit) although the protective case is activated as physical protection of the component.

It is an object of the invention to provide a gaming machine for protecting power generation circuits of cold-cathode tubes used with a liquid crystal display.

It is another object of the invention to provide a gaming machine including common protective members for diffusing emitted light for also functioning as reel illumination.

Figure 1:
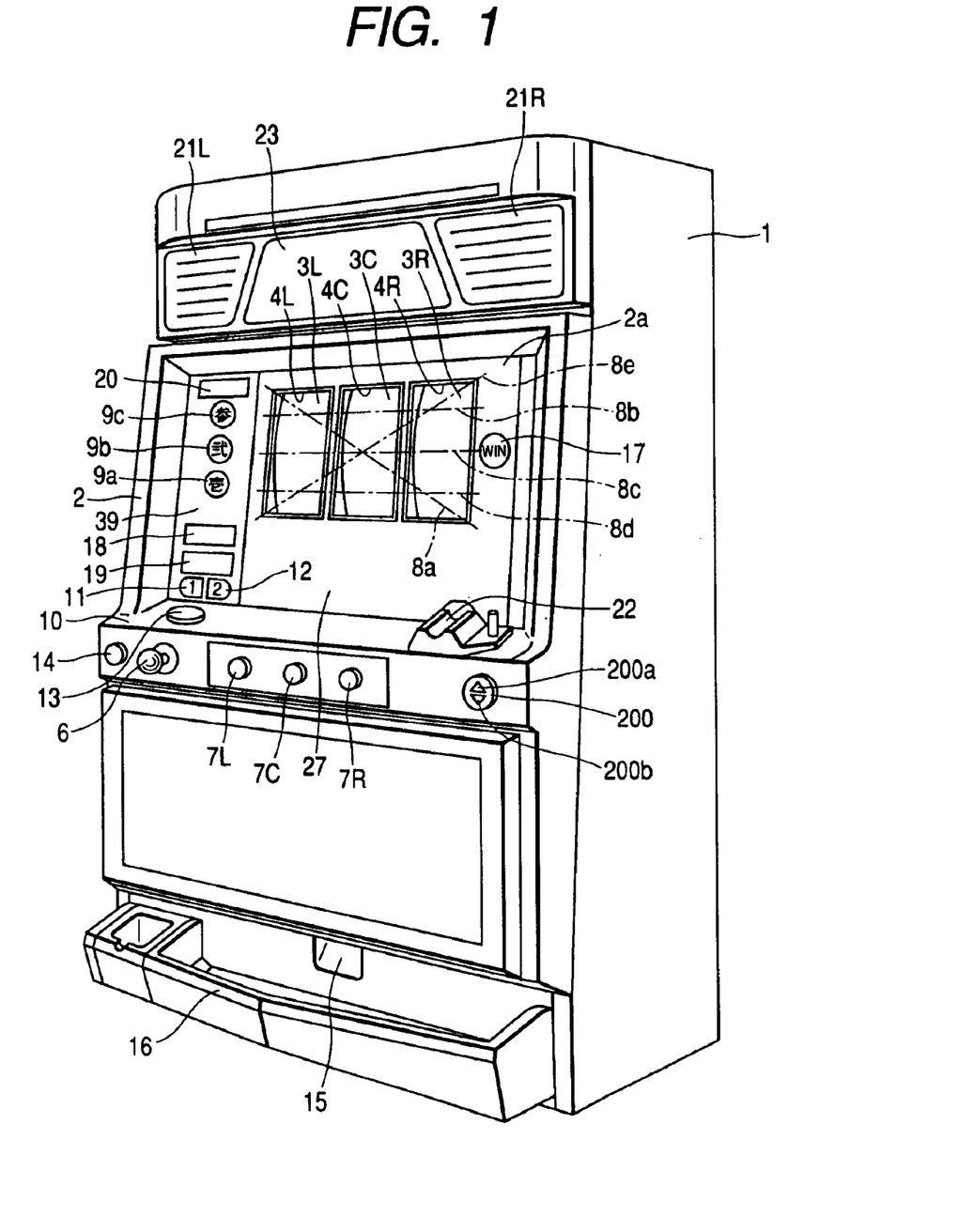
FIG. 1 is a perspective front view of a slot machine of an embodiment of the invention.
Figure 3:
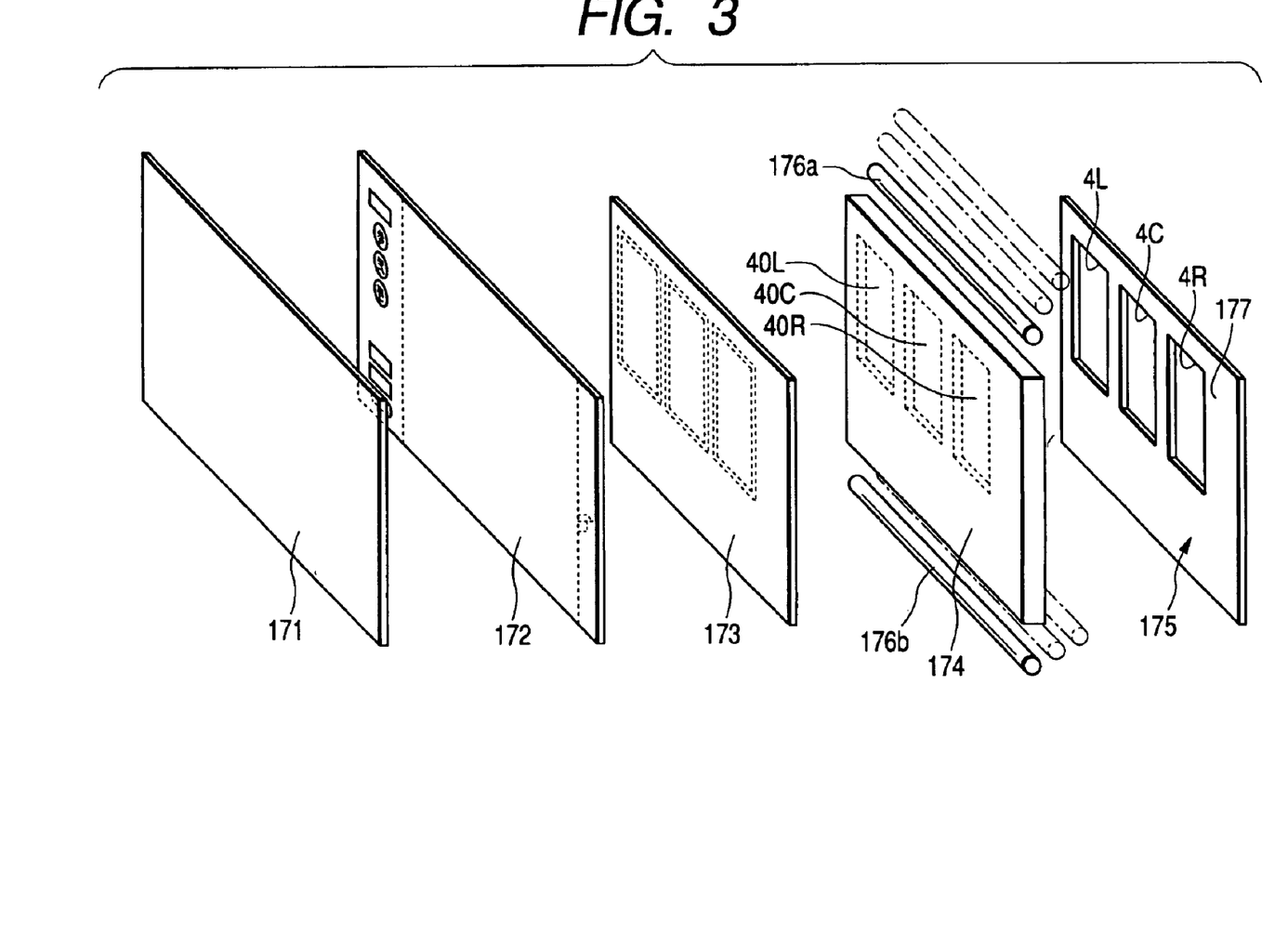
FIG. 3 is an exploded perspective view of a liquid crystal display.
Figure 4:
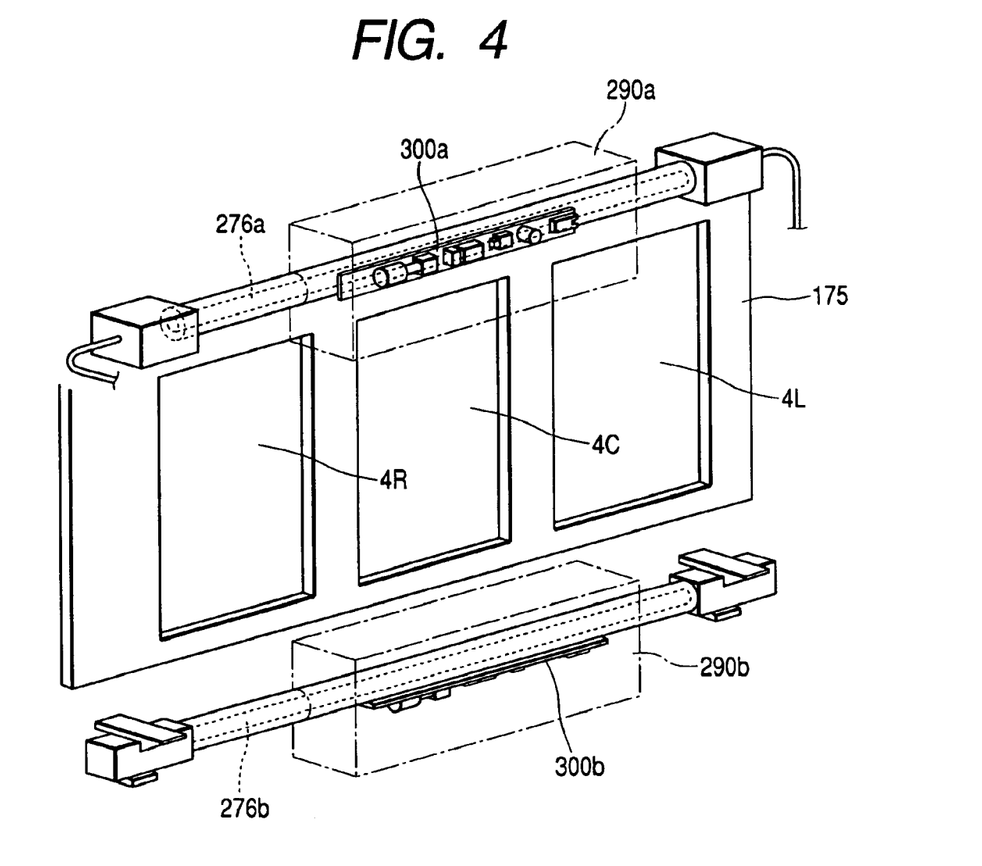
FIG. 4 is an exploded perspective view of the proximity of reel display windows.

According to the invention, there is provided a gaming machine including: a liquid crystal display 27 including: a liquid crystal panel 173; and a light guiding plate 174 disposed at a rear of the liquid crystal panel 173 in which formed with light transmission areas 40L, 40C, 40R, and configured to guide light emitted from illumination means 176a, 176b for the liquid crystal panel 173 to the liquid crystal panel 173; a variable display device disposed at a rear of the liquid crystal display device 27 and opposing to the light transmission areas 40L, 40C, 40R, and including a plurality of reels 3L, 3C, 3R provided in a row each on which a plurality of symbols are arranged; light emission means 276a, 276b disposed in a proximity of the light transmission areas 40L, 40C, 40R on a side of the reels 3L, 3C, 3R; a drive unit 300a, 300b configured to drive the light emission means 276a, 276b; and a protective member 290a, 290b configured to cover the drive unit 300a, 300b and having an outer shape so as to be distant from the drive unit 300a, 300b at a predetermined distance or more, for example, as shown in FIGS. 1, 3, and 4.

In the configuration, the protective member covers the drive unit for driving the light emission means and is at a predetermined distance or more distant from the drive unit, so that the gaming machine for protecting the drive unit from external contact or an external magnetic force can be provided.

Figure 6A:
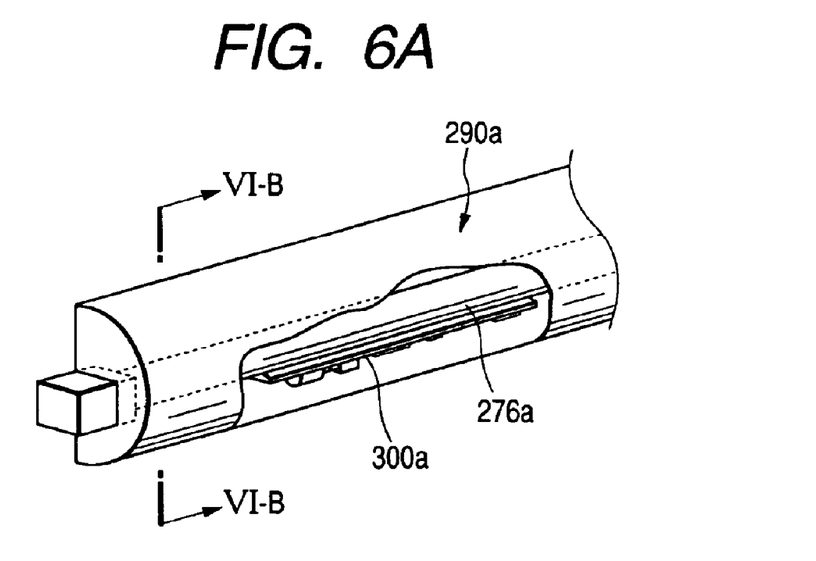
FIG. 6A is a perspective view of a cold-cathode tube and a protective case and FIG. 6B is a sectional view taken on line VI-B—VI-B in FIG. 6A.
Figure 6B:
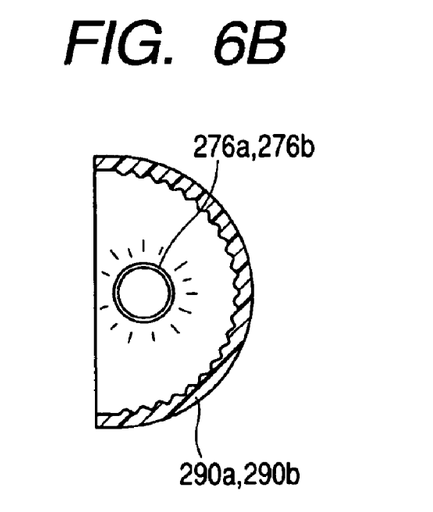

The protective member 290a, 290b may cover a light emission part of the light emission means 276a, 276b and may diffuse light from the light emission part, as shown in FIG. 6.

The protective member 290a, 290b may be formed in a shape to diffuse light from the light emission part, as shown in FIG. 6.

The protective member 290a, 290b may be formed of a material that diffuses light from the light emission part, as shown in FIG. 6.

In the configuration, emitted light can be diffused through the protective member for functioning as reel illumination light, so that the player can be made to see the reels brightly and the effect of the reels can be produced powerfully or in a soft sense.

DETAILED DESCRIPTION OF THE PREFERRED EMBODIMENTS

Referring now to the accompanying drawings, there is shown a preferred embodiment of the invention. FIGS. 1 through 7 show one embodiment of the invention. In the figures, members denoted by the same reference numerals represent the same or corresponding members, and a detailed description of the same parts will be omitted.

FIG. 1 is a perspective front view to show the appearance of a gaming machine 1 of an embodiment of the invention. The gaming machine 1 is a pinball slot machine (a so-called "Pachi-Slot machine" in Japan). The gaming machine 1 is provided for the player to play a game using game medium such as a card storing information of the game play value given to the player as well as coins, medals, game play balls and tokens. In the description that follows, it is assumed that the player uses medals.

A panel display unit 2a roughly as a vertical plane is formed at the front of a cabinet 2 forming the whole of the gaming machine 1, and vertically oriented rectangular reel display windows 4L, 4C, and 4R are provided at the center of the panel display unit 2a. The reel display windows 4L, 4C, and 4R are formed with a top line 8b, a center line 8c, and a bottom line 8d in the horizontal direction and a cross down line 8a and cross up line 8e in the slanting directions as pay lines. As the pay lines, one, three, or five lines are made activated as the player operates a 1-BET switch 11, a 2-BET switch 12, or a MAX-BET switch 13 (described later) or inserts medals into a medal insertion slot 22. Which pay lines are made activated is indicated as a BET lamp 9a, 9b, or 9c (described below) is lighted. The pay lines 8a to 8e are involved in whether or not a winning combination is won.

That is, if one symbol (for example, "cherry symbol 97" (described later)) corresponding to a predetermined prize (for example, small prize of cherry (described later)) is stopped and displayed at a predetermined position (for example, a position in the left display window 4L if the BET count (described later) is "3") corresponding to any pay line made activated or if the symbols making up the symbol combination corresponding to a predetermined prize are stopped and displayed in a row at a predetermined position corresponding to any pay line made activated, the winning game of the predetermined prize is complete.

In the cabinet 2b, three reels 3L, 3C, and 3R each with a symbol row including different types of symbols placed on the outer peripheral surface are provided in a row for rotation, making up variable display device. The player can observe the symbols on the reels through the reel display windows 4L, 4C, and 4R. Each reel rotates at rotation speed of 80 revolutions per minute, for example, at the constant rotation time.

The 1-BET lamp 9a, the 2-BET lamp 9b, the MAX-BET lamp 9c, and a credit display unit 19 are provided on the left of the reel display windows 4L, 4C, and 4R. The 1-BET lamp 9a, the 2-BET lamp 9b, or the MAX-BET lamp 9c is lighted in response to the number of medals bet to play one game, which will be hereinafter referred to as the BET count. In the embodiment, one game is over when all reels stop. When the BET count is "1" and one pay line is made activated, the 1-BET lamp 9a is lighted; when the BET count is "2" and three pay lines are made activated, the 2-BET lamp 9b is lighted; and when the BET count is "3" and all the five pay lines are made activated, the MAX-BET lamp 9c is lighted. The credit display unit 19 includes seven-segment LEDs for displaying the deposited number of medals.

A notification lamp (WIN lamp 17) and a payout display unit 18 are provided on the right of the reel display windows 4L, 4C, and 4R. The notification lamp 17 basically is lighted until a winning game of BB or RB is complete after it is made possible to realize completion of the win of BB or RB. The BB and RB will be hereinafter collectively called "bonus." The payout display unit 18 includes seven-segment LEDs for displaying the number of medals paid out when a winning game is complete.

A bonus game information display unit 20 is provided in the upper left corner of the panel display unit 2a. The bonus game information display unit 20 includes seven-segment LEDs for displaying the number of games in BB general game state (described later). A frontward projection portion 10 of a horizontal plane is formed below the reel display windows 4L, 4C, and 4R. A liquid crystal display 27 is placed between the frontward projection portion 10 and the reel display windows 4L, 4C, and 4R for displaying information concerning game play, on the roughly full face of the liquid crystal display 27.

The BB and RB are as follows: The current mainstream model has different winning states. Particularly, when the winning game of a prize is complete, the player is placed in a game state in which the player is given a better condition than the usual state for a predetermined time period in addition to paying out a predetermined number of medals. Such prizes include a prize for allowing the player to play a predetermined number of games giving a relatively large prize to the player, and a prize for allowing the player to play a predetermined number of games giving a relatively small prize to the player. The former is referred to as big bonus (BB), and the latter is referred to as regular bonus (RB).

The medal insertion slot 22 is provided on the right of the liquid crystal display 27, and the 1-BET switch 11, the 2-BET switch 12, and the MAX-BET switch 13 are provided on the left of the liquid crystal display 27. The 1-BET switch 11 enables the player to bet one of the credited medals by one push operation on a game. The 2-BET switch 12 enables the player to bet two of the credited medals by one push operation on a game. The MAX-BET switch 13 enables the player to bet as many medals as the maximum number of medals that can be bet on a game by one push operation. As the player operates any of the BET switches, the corresponding pay lines are made activated as described above.

A C/P switch 14 for the player to switch between credit and payout of the medals obtained by playing games by pushbutton operation is provided on the left of the front of the frontward projection portion 10. As the C/P switch 14 is switched, medals are paid out from a medal payout opening 15 in a lower part of the front and are stored in a medal reception tray 16. On the right of the C/P switch 14, a start lever 6 for rotating the reels for starting variable display of symbols in the reel display windows 4L, 4C, and 4R as, the player operates the start lever 6 is attached so that it can be turned in a predetermined angle range.

Speakers 21L and 21R are provided on the upper left and right of the cabinet 2, and a payout table panel 23 for displaying winning symbol combination, the number of payout medals, and the like is provided between the two speakers 21L and 21R. Three reel stop buttons (stop operation means) 7L, 7C, and 7R for stopping rotation of the three reels 3L, 3C, and 3R are provided at the center of the front of the frontward projection portion 10 and below the liquid crystal display 27.

A scroll switch 200 as switching means of a menu screen displayed on the liquid crystal display 27 is provided on the right of the reel stop button 7R; the player can switch a menu by operating an upper scroll switch 200a and a lower scroll switch 200b.

Figure 2:
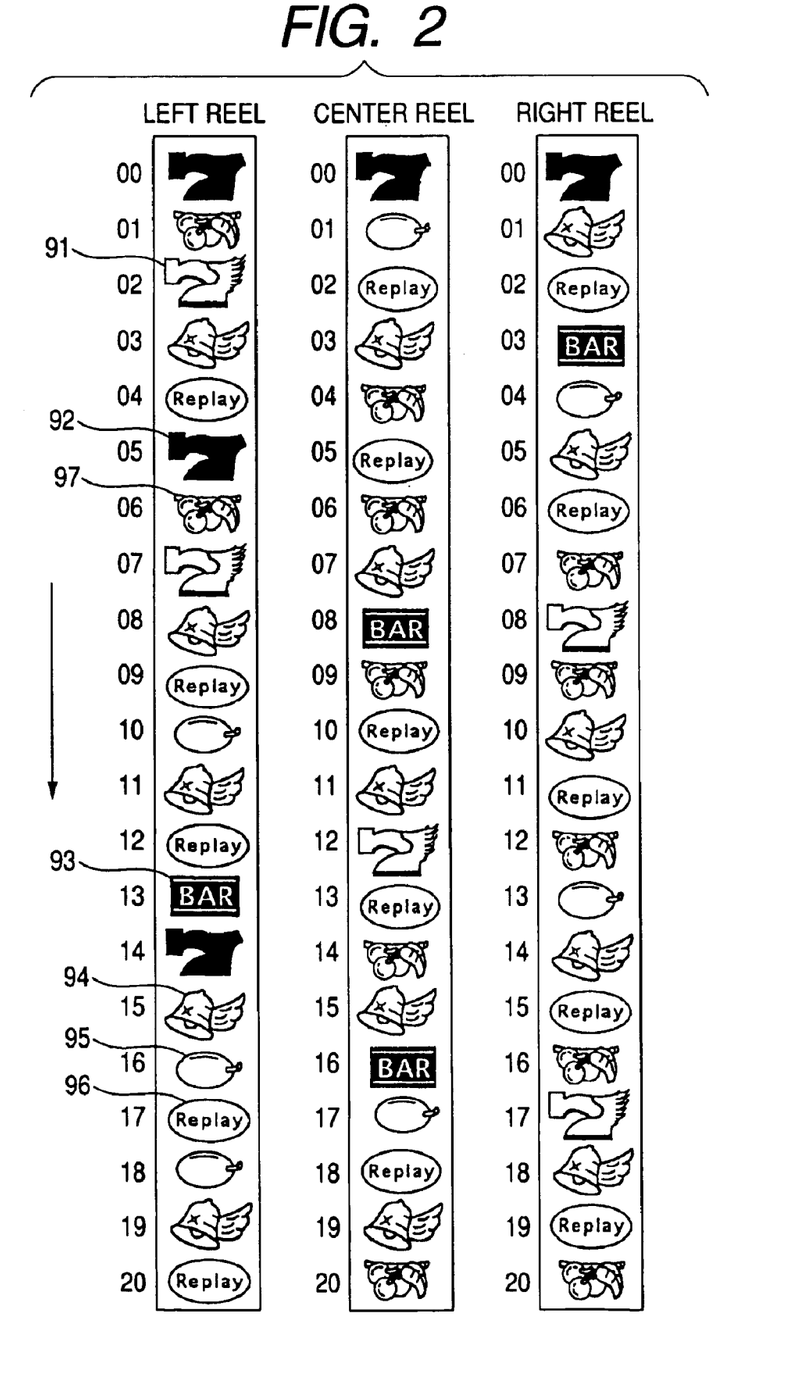
FIG. 2 is a drawing to show examples of symbols arranged on reels.

FIG. 2 shows symbol rows each made up of 21 symbols represented on each reel 3L, 3C, 3R used in the embodiment. The symbols are given code numbers 00 to 20 and are stored in ROM 32 (see FIG. 3) described later as a data table. The symbol rows each made up of symbols of "red 7 symbol 91," "blue 7 symbol 92," "BAR symbol 93," "bell symbol 94," "plum symbol 95," "Replay symbol 96," and "cherry symbol 97" are represented on the reels 3L, 3C, and 3R. The reels 3L, 3C, and 3R are rotated so that the symbol rows move in the lower arrow direction shown on the left in the figure.

FIG. 3 is an exploded perspective view to show a schematic configuration of the liquid crystal display 27. The liquid crystal display 27 includes protective glass 171 of the first layer provided on the front of the liquid crystal display 27, a display plate 172 of the second layer placed on the back of the protective glass 171, a liquid crystal panel 173 of the third layer placed on the back of the display plate 172, a light guiding plate 174 of the fourth layer placed on the back of the liquid crystal panel 173, and a reflection film 175 of the fifth layer placed on the back of the light guiding plate 174 as a five-layer panel structure. The liquid crystal display 27 further includes a flexible board (not shown) implemented as a table carrier package (TCP) on which a liquid crystal panel drive IC is mounted, connected to a terminal section of the liquid crystal panel 173, and the like. The liquid crystal display 27 is disposed on the front of the reels 3L, 3C, and 3R with a predetermined spacing from the reels 3L, 3C, and 3R as a separate body from the reels 3L, 3C, and 3R.

The protective glass 171 and the display plate 172 are formed each of the translucent member. The protective glass 171 is provided for the purpose of protecting the liquid crystal panel 173, etc., and an image is drawn in the area of the display plate 172 corresponding to the panel display unit 2a (see FIG. 1). FIG. 3 does not show various display units placed at the rear in the area of the display plate 172 corresponding to the panel display unit 2a or an electric circuit for operating the 1-BET lamp 9a, the 2-BET lamp 9b, and the MAX-BET lamp 9c.

The liquid crystal panel 173 is formed by sealing liquid crystal into the gap between a transparent substrate such as a glass plate formed with a thin-film transistor layer and a transparent substrate opposed to that substrate. The display mode of the liquid crystal panel 173 is set to "normally white". The normally white is a mode in which white display is produced with the liquid crystal not driven, namely, light passes through to the display face side and is visually recognized from the outside. As the liquid crystal panel 173 set to normally white is adopted, if a situation in which the liquid crystal cannot be driven occurs, the player can visually recognize the symbols placed on the reels 3L, 3C, and 3R varying or stopped on the display through the reel display windows 4L, 4C, and 4R and can continue to play a game.

Further, a diffusion sheet (not shown) is placed between the liquid crystal panel 173 and the light guiding plate 174. The diffusion sheet has the portions corresponding to windows 40L, 40C, and 40R cut out or is formed of a transparent member so as not to degrade the transparency of the windows 40L, 40C, and 40R as light transmission areas of the light guiding plate 174, namely, so as to enhance the viewability of the reels 3L, 3C, and 3R positioned behind the liquid crystal display 27.

The light guiding plate 174 is disposed on the back of the liquid crystal panel 173 for guiding light applied from cold-cathode tubes 176a and 176b as illumination means placed on end faces into the liquid crystal panel 173 to illuminate the liquid crystal panel 173; the light guiding plate 174 is implemented as a translucent member having a light guide function, such as an acrylic-based resin having a thickness of about 2 cm, for example. Fluorescent lamps can also be used in place of the cold-cathode tubes.

The cold-cathode tube 176a, 176b (if the screen size is large, a plurality of cold-cathode tubes are provided in the depth direction) is implemented as a white light source containing light of all wavelengths in a percentage in which a specific color is not conspicuous for eyes of a human being. The cold-cathode tube 176a is disposed along the upper end portion of the light guiding plate 174 (placed upright in the vertical direction) in the figure; the cold-cathode tube 176b is disposed along the lower end portion of the light guiding plate 174 in the figure. The cold-cathode tube 176a, 176b is supported at both ends by a lamp holder (not shown). The cold-cathode tube 176a, 176b functions as illumination means for the area corresponding to the effect display area mainly in the area of the liquid crystal panel 173. That is, the cold-cathode tube 176a, 176b generates light to be introduced into the light guiding plate 174.

To upsize the liquid crystal screen, for example, to increase the screen size from 15 inches to 20 inches, it is necessary to increase the number of cold-cathode tubes 176a, 176b of light emission means, for example, from one to three in the depth direction to maintain the light amount. It is also necessary to thicken the light guiding plate 174 as the number of the cold-cathode tubes is increased.

The reflection film 175 is provided by executing sputter deposition of a silver evaporated film on a white polyester film or aluminum thin film, for example, and is used to reflect the light introduced into the light guiding plate 174 toward the front of the light guiding plate 174, namely, in the direction of the liquid crystal panel 173. The reflection film 175 includes a reflection area 177 and the reel display windows 4L, 4C, and 4R as non-reflection areas.

The left, center, and right reel display windows 4L, 4C, and 4R correspond to the left, center, and right reels 3L, 3C, and 3R respectively, and are formed as cutouts or formed of transparent material as transmission display parts for allowing incident light to pass through. The reel display window 4L, 4C, 4R is positioned ahead of the symbols displayed when rotation of the reel 3L, 3C, 3R stops, and has a size capable of displaying a total of three symbols at upper, center, and lower stages at the stop display time. The reflection area 177 of the reflection film 175 reflects incident light and functions as one of the illumination means for the area corresponding to the effect display area mainly in the area of the liquid crystal panel 173. The configuration enables the player to visually recognize variable display device and stop display of the reels 3L, 3C, and 3R through the transmission display parts of the reflection means and thus makes it possible for the player to enjoy playing a game according to the display mode of the reels 3L, 3C, and 3R and the liquid crystal display 27.

FIG. 4 is a perspective view of the proximity of the reel display windows 4L, 4C, and 4R viewed from the inside of the gaming machine. Since the windows 40L, 40C, and 40R (shown in FIG. 3) opposed to the cutouts of the reflection film 175 involve weak backlight effect, cold-cathode tubes 276a and 276b as light emission means for illuminating the windows 40L, 40C, and 40R and the reels 3L, 3C, and 3R (see FIG. 1) as auxiliary light sources are placed above and below the reel display windows 4L, 4C, and 4R aside from the cold-cathode tubes 176a and 176b as the backlight light sources. The cold-cathode tubes 276a and 276b are attached to holder plates (not shown) placed upright in the vertical direction on the back of the reflection film 175 and thus are placed in the proximity of the windows 40L, 40C, and 40R. The cold-cathode tubes 276a and 276b installed here are lighted by inverter boards 300a and 300b as drive units each including a high-frequency transformer of a power generation circuit. The inverter boards 300a and 300b are covered with protective cases 290a and 290b as protective members with a predetermined clearance therebetween. The light emission means can be not only placed above and below the reel display windows 4L, 4C, and 4R, but also placed in the surroundings of the reel display windows 4L, 4C, and 4R, of course; a fluorescent lamp can also be used in place of the cold-cathode tube.

The protective case 290a installed above the reel display windows 4L, 4C, and 4R covers the cold-cathode tube 276a and the inverter board 300a with a predetermined clearance, and the protective case 290b installed below the reel display windows 4L, 4C, and 4R covers the cold-cathode tube 276b and the inverter board 300b with a predetermined clearance. The protective case 290a, 290b uses a member having a clearance of several centimeters so that the conceivable effect of a magnetic force such as a magnetized screwdriver can be avoided so as not to receive the effect of an external magnetic force in addition to preventing physical destruction of the inverter board 300a, 300b or the cold-cathode tube 276a, 276b.

Accordingly, the inverter boards 300a and 300b, particularly coils (described later) can be prevented from being destroyed by an external magnetic force.

Figure 5:
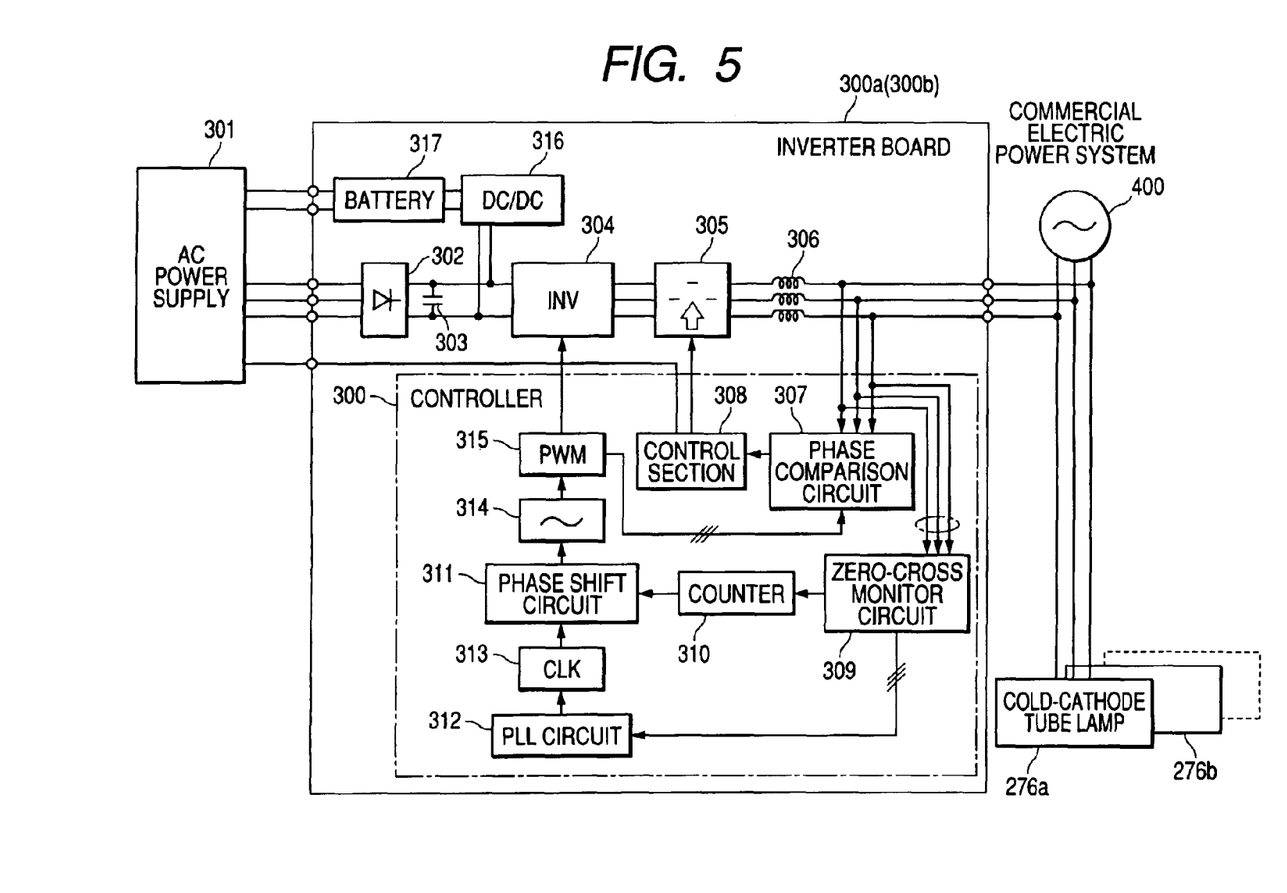
FIG. 5 is a block diagram to show an example of the circuit configuration of an inverter board.

FIG. 5 is a block diagram to show an example of the circuit configuration of the inverter board. In the inverter board 300a (300b), upon reception of an alternating current supplied from an external AC power supply 301, the alternating current is converted into a direct current by a bridge rectifier 302 and the direct current is smoothed by a smoothing capacitor 303 and is supplied to an inverter circuit 304. As a voltage is applied to a gate of the inverter circuit 304 by a control circuit 300 (PWM (pulse with modulation) circuit), the inverter circuit 304 converts the direct current into a three-phase alternating current and supplies the three-phase alternating current through a shut-off switch 305 to a high-frequency transformer 306. The voltage stepped up through the high-frequency transformer 306 is supplied to the cold-cathode tube 276a (276b) as a load for lighting the cold-cathode tube 276a (276b). In the shown power supply circuit, three-phase alternating current is converted into direct current and then again alternating current is supplied by way of example. However, the invention is not limited to the three-phase alternating current power supply and can also be applied to any circuit for supplying a single-phase (two-phase) alternating current, of course. In short, any means can be applied if an induction coil connected to the alternating current output can be protected.

The shut-off switch 305 is used to protect the circuitry if a commercial electric power system 400 fluctuates. As a closed magnetic transformer is used as the high-frequency transformer 306, the cost can be reduced. Further, as the thickness of the light guiding plate 174 increases with upsizing of the liquid crystal screen, a plurality of cold-cathode tubes 276a, 276b may be installed, in which case the inverter circuit 304 needs to have a required capacity accordingly.

On the other hand, output of the high-frequency transformer 306 is also supplied to a phase comparison circuit 307 for controlling the shut-off switch 305 through a control section 308. Output of the high-frequency transformer 306 is monitored in a zero-cross monitor circuit 309, and the number of times of zero-crossing (alternating current 0 V) monitored in the zero-cross monitor circuit 309 is counted by a counter 310 and is supplied to a phase shift circuit 311.

The zero-cross monitor circuit 309 also supplies zero-cross signal to a PLL (phase-locked loop) circuit 312. A clock 313 generated in phase synchronization in the PLL circuit 312 is supplied to the phase shift circuit 311. The phase shift circuit 311 outputs a sine wave 314 for driving a PWM circuit 315. The PWM circuit 315 applies a voltage to the gate of the inverter circuit 304, whereby three-phase alternating current can be output.

Output of the smoothing capacitor 303 is also supplied to a DC-DC converter 316. The DC-DC converter 316 supplies direct current output stepped down from 200 V to 12 V to a battery 317 for charging the battery 317.

As shown in FIGS. 6A and 6B, the protective case 290a, 290b is shaped so as to completely cover not only the inverter board 300a, 300b, but also the cold-cathode tube 276a, 276b and is formed with a cut shape or is subjected to opacification to provide diffusion effect so that diffused light is applied to the reels 3L, 3C, and 3R. FIG. 6A is a perspective view of the cold-cathode tube and the protective case, and FIG. 6B is a sectional view taken on line VI-B—VI-B in FIG. 6A.

Accordingly, in addition to protecting the inverter board 300a, 300b from the magnetic force, the light emitted from the cold-cathode tube 276a, 276b can be diffused; while the protective case 290a, 290b (the cold-cathode tube 276a, 276b) functions as illumination light of the reels 3L, 3C, and 3R, glare of the cold-cathode tube 276a, 276b on the reels 3L, 3C, and 3R can be prevented.

As compared with the protective case 290a, 290b of the cold-cathode tube 276a, 276b shaped like a cylinder or a rectangular parallelepiped shown in FIG. 4, the player is hard to recognize the cold-cathode tube reflected on the reel, and further uniform illumination can be provided.

Figure 7:
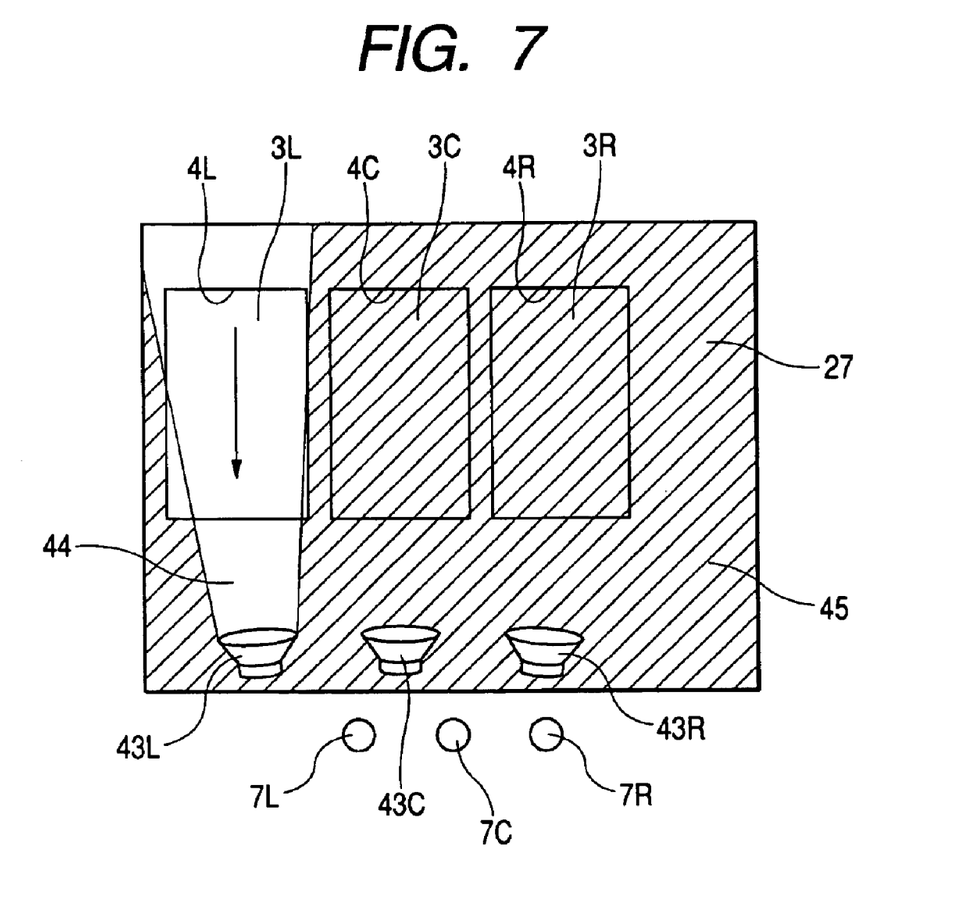
FIG. 7 is a drawing to show the effect of the gaming machine of the embodiment of the invention.

FIG. 7 is a schematic drawing to show an example of the effect mode of the gaming machine of the embodiment of the invention. It shows the display mode of stop notification for notifying the player of the stop order of the reels. The liquid crystal display 27 of the gaming machine can be made up of the protective glass, the display plate, the liquid crystal panel, the light guiding plate, and the reflection film in order from the front to the back as the panel structure as described above.

As shown in FIG. 7, virtual light sources 43L, 43C, and 43R are placed in order from left to right in the figure at the bottom of the liquid crystal display 27. From the virtual light source 43L, a searchlight image 44 as a transmission display part is disposed as an image for illuminating the left reel 3L disposed above the virtual light source 43L. The searchlight image 44 is an image from the outside of the area of the left reel display window 4L of the left reel 3L, the center reel display window 4C, and the right reel display window 4R to the inside of the area. The searchlight image 44 is superposed on the reel symbols through the display of the portion which includes at least a part of the searchlight image 44 in the display area (FIG. 6). Whereby, the symbols on the left reel 3L are displayed through the searchlight image 44. Accordingly, the player is notified of the reel stop order and is prompted to operate the button.

A non-transmission display area 45 of image area of the liquid crystal display 27 except for the searchlight image 44 and the display areas of the reel display windows of the center reel 3C and the right reel 3R are superposed on each other, whereby the player can be prevented from visually recognizing the center reel 3C and the right reel 3R which are producing variable display device.

At this time, the player can see the left reel 3L through the superposition of the searchlight image 44 and the display window 4L. According to the configuration of the embodiment, the light emitted from the cold-cathode tube 276a, 276b can be diffused through the protective case 290a, 290b shown in FIG. 4, FIG. 6; while the protective case 290a, 290b (the cold-cathode tube 276a, 276b) functions as illumination light of the reels 3L, 3C, and 3R, glare of the cold-cathode tube 276a, 276b on the reels 3L, 3C, and 3R can be prevented and the appearance of the gaming machine is not impaired.

Further, the invention can be applied not only to the pinball slot machine as in the embodiment, but also to any other gaming machine such as a pinball machine (a so-called "Pachinko machine" in Japan).

The gaming machine of the embodiment includes the liquid crystal display having the liquid crystal panel and the light guiding plate being placed at the rear of the liquid crystal panel for guiding light emitted from the illumination means for the liquid crystal panel into the liquid crystal panel, the light guiding plate being formed with light transmission areas through which light passes; the variable display device being placed at the rear of the liquid crystal display and opposed to the light transmission areas and comprising a plurality of reels provided in a row each on which a plurality of symbols are arranged; the light emission means being provided in the proximity of the light transmission areas on the reel side; the drive unit for driving the light emission means; and the protective member for covering the drive unit, the protective member having the outer shape at a predetermined distance or more distant from the drive unit. Thus, the gaming machine for protecting the power generation circuits of the cold-cathode tubes from external contact or the external magnetic force can be provided.

In the gaming machine of the embodiment, the protective member covers the light emission part of the light emission means and diffuses light from the light emission part, so that the gaming machine also functioning as reel illumination can be provided.

Further in the gaming machine of the embodiment, the protective member is formed as the shape for diffusing light from the light emission part. Thus, light can be diffused for illuminating the reels, enabling the player to see the reels brightly; the powerful effect of the reels can be produced.

Further in the gaming machine of the embodiment, the protective member is formed of the material for diffusing light from the light emission part. Thus, light can be diffused for illuminating the reels, enabling the player to see the reels brightly; the effect of the reels can be produced in a soft sense.

As for the functions and the advantages described in the embodiment of the invention, the preferred functions and advantages produced from the invention are only enumerated and the functions and the advantages of the invention are not limited to those described in the embodiment of the invention.

As described above, according to the invention, the gaming machine for protecting the drive units of the light emission means used with the liquid crystal display can be provided.

Although only some exemplary embodiments of the invention have been described in detail above, those skilled in the art will readily appreciate that many modifications are possible in the exemplary embodiments without materially departing from the novel teachings and advantages of the invention. Accordingly, all such modifications are intended to be included within the scope of the invention.

What is claimed is:

1. A gaming machine comprising:
    a liquid crystal display device including: a liquid crystal panel; and a light guiding plate in which formed with a light transmission area through which passes light and disposed at a rear of the liquid crystal panel, and configured to guide light emitted from illumination means for the liquid crystal panel to the liquid crystal panel;
    a variable display device disposed at a rear of the liquid crystal display device and opposing to the light transmission area, and including a plurality of reels provided in a row each on which a plurality of symbols are arranged;
    light emission means disposed in a proximity of the light transmission area on a side of the reel;
    a drive unit configured to drive the light emission means; and
    a protective member configured to cover the drive unit and at least a portion of the light emission means, said protective member having an outer shape that is separated from the drive unit at at least a predetermined distance.

2. The gaming machine as claimed in claim 1, wherein the protective member is formed in a shape to diffuse the light emitted by the light emission part.

3. The gaming machine as claimed in claim 1, wherein the protective member is formed of a material that diffuses the light emitted by the light emission part.

4. The gaming machine as claimed in claim 1, wherein the outer shape of said protective member is separated from the drive unit at at least a predetermined distance to avoid an effect on the driver unit by an external magnetic force.

* * * * *